April 14, 1964 E. J. JOHNSTON 3,128,586
HAY CONDITIONER WITH MECHANISM FOR CONTROLLING HEIGHT AND DROP
Filed March 5, 1962
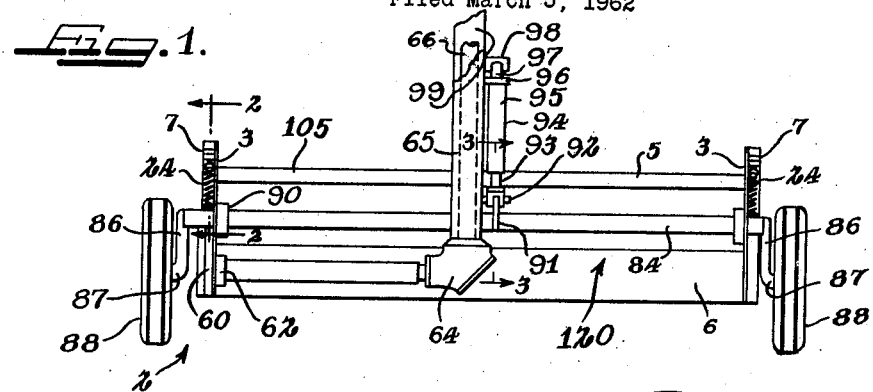
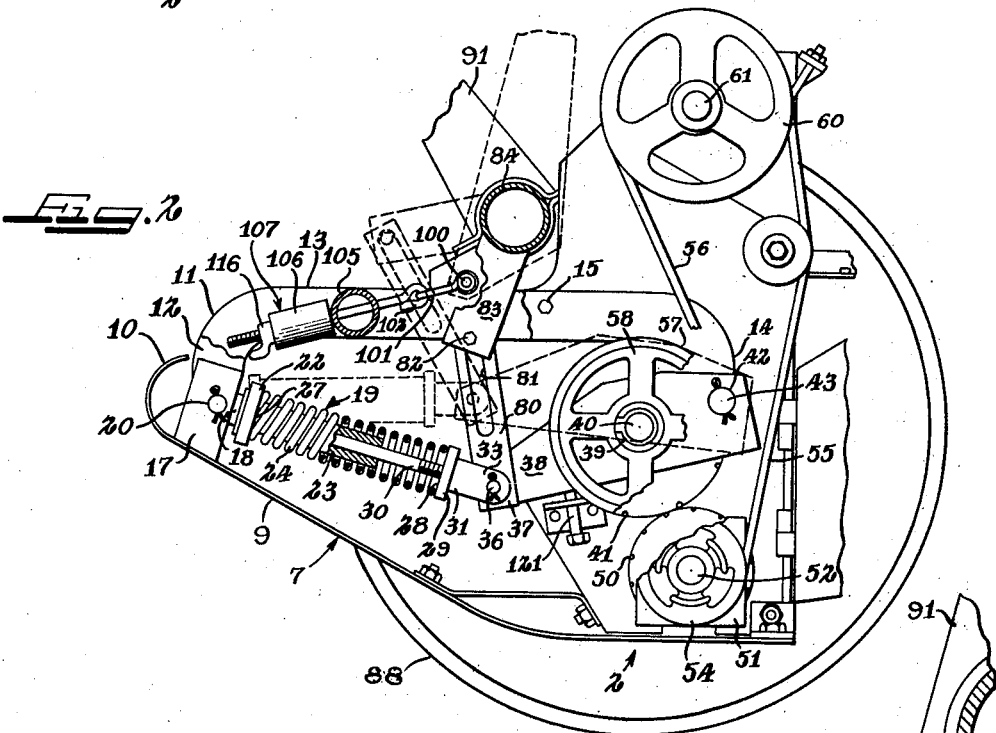
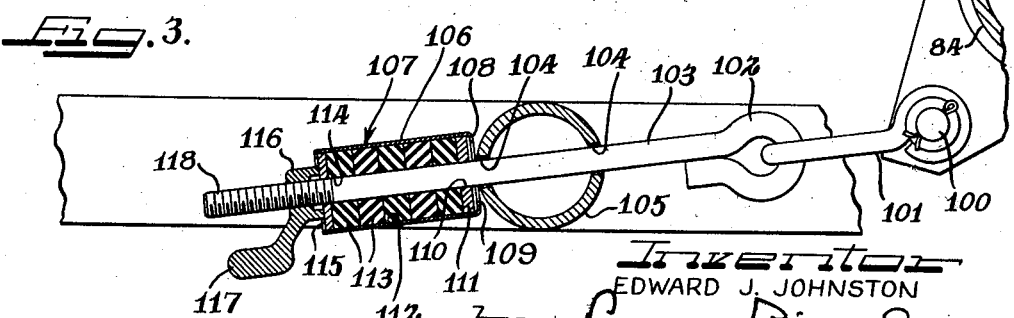
INVENTOR
EDWARD J. JOHNSTON

United States Patent Office 3,128,586
Patented Apr. 14, 1964

3,128,586
HAY CONDITIONER WITH MECHANISM FOR CONTROLLING HEIGHT AND DROP
Edward J. Johnston, La Grange Park, Ill., assignor to International Harvester Company, Chicago, Ill., a corporation of New Jersey
Filed Mar. 5, 1962, Ser. No. 177,452
4 Claims. (Cl. 56—1)

This invention relates to hay conditioners and more specifically to a novel mechanism for positioning the rolls of such conditioner at predetermined height with respect to the ground and which serves as a shock absorber upon the machine being lowered.

A general object of the invention is to provide a novel mechanism for controlling the operation of the raising and lowering apparatus of the implement.

The invention specifically pertains to a hay conditioner of the type wherein the conditioning apparatus is carried from a wheel and axle assembly which raises and lowers the conditioning apparatus by means of a single acting cylinder such that upon the cylinder being evacuated the apparatus is caused to drop to its preset position.

In such units, that is, where the conditioning apparatus is raised and lowered with respect to the supporting wheels by means of a single acting cylinder, the exhausting of the cylinder permits the apparatus to fall freely and it being of considerable mass falls with such violence that parts of the equipment become damaged.

Specifically, the invention is applicable to structure wherein the conditioning component is carried from a wheel and axle assembly which is swingable about a horizontal axis with respect to the conditioning component, and wherein the conditioning component is raised and lowered attendant to such swinging movement of the wheel and axle assembly and such swingable movement being effected by a hydraulic unit and particularly a single acting cylinder such that upon the cylinder being evacuated there is no means for retarding or controlling the descent of the conditioning component.

The invention comprises the provision of a novel shock absorbing mechanism which reacts between the main frame and the operating linkage which on descent moves in a direction opposite to that in which it moves when elevating the conditioning component.

These and other objects and advantages inherent in and encompassed by the invention become more readily apparent from the specification and the drawings, wherein:

FIG. 1 is a plan view of a hay conditioner incorporating the invention;

FIG. 2 is an enlarged side elevational view partially in vertical section taken substantially on line 2—2 of FIG. 1; and FIG. 3 is an enlarged sectional view taken substantially on the line 3—3 of FIG. 1.

Describing the invention in detail, there is shown a hay conditioner generally designated 2 comprising a framework which includes a pair of upright fore-and-aft extending side panels or walls 3—3 with an interconnecting front brace 5 and a rear sheet metal beam member 6. The lower edges of the panels 3—3 are provided with runners or shoes 7—7 which are adapted to limit downward movement of the unit. These shoes project diagonally upward and forwardly as shown at 9 in FIG. 2.

The upper end of each shoe portion 9 is turned rearwardly as at 10 and in effect forms a divider and a shield for the mounting arm 11 which is turned downwardly at its forward end 12 and suitably connected to the associated shoe as hereinafter described. The arm or support member 11 has a horizontal straight portion 13 and a downwardly and rearwardly bent rear portion 14 (FIG. 2). It will be seen in FIG. 2 that the member 11 is connected on the portion 13 as by bolting at 15 to related side panel 3 and that the depending forward end of each arm 11 serves as an anchor together with bracket 17 which joins with portion 9 of the shoe and provides an anchor for the upper forward end 18 of the loading spring assembly 19, the end 18 being in the form of an eye which is pivoted to pin 20 which projects transversely and horizontally through the bracket 17 and end 12 of arm 13. Each spring assembly 19 comprises a mounting and seating cap 22 which is threaded on the sleeve 23 which extends through the spring 24, the sleeve 23 being integrated with the portion 18 disposed in telescoped relation with the internal side of the associated spring 24. It will be seen that the spring 24 seats at its upper end as at 27 against the interior side of the cap 22 and at its other end seats as at 28 against an adjustable cap or seating member 29. The seating member 29 is threaded on the shank 30 of the member 31 which telescopes into the member or sleeve 23 and collectively therewith serves as a stabilizer for the spring to prevent its transverse deflection. It will be seen that by advancing the seating member 29 on the shank portion 30 of the connecting member 31 the compression of the spring 24 is increased and by retracting the seating member 29 by unthreading the compression of spring 24 is decreased. As herein shown the member 22 may be rigid with sleeve portion 23 and only the member 29 may be rotated by a threaded portion 30 for adjusting the loading on the spring.

The output end 33 of the spring assembly 19 is pivoted as at 36 by a pin to the lower end 37 of a lever 38, the mounting at 36 being disposed on a substantially horizontal axis. The lever or carrier 38 is provided with a bearing 39 intermediate its ends mounting or journaling the shaft 40 of an upper roll 41, the rear end of the lever 38 being pivoted as at 42 on a pin 43 which is suitably mounted on an associated side wall 3 and extending through the rear end portion 14 of the associated end portion 14 of the U-shaped mounting anchor 11 as best seen in FIG. 3. Thus it will be seen that the normal tendency of the spring assembly 19 is to urge the forward end of the lever assembly 38 downwardly about the pivot point 42 and that the assembly 19 and lever assembly 38 are arranged in toggle fashion, that is, they converge downwardly toward point 36 and are mounted at fixed anchors at their remote ends. The upper roll is urged into engagement with the lower roll 50 which is mounted at opposite ends in bearing structures 51 which are mounted in respective side walls 3 of the main frame. The bearing structures 51 carry the center shaft 52 of the lower roll 50. The shaft 52 projects outwardly at the left side of the machine as viewed from the rear in FIG. 1 and is connected to a pulley 54 (FIG. 2) about which is trained a belt 55, the belt having a forward run 56 which is wrapped about the rear side 57 of a pulley 58, the pulley 58 being mounted on the extension of the shaft 40 of the upper roll 41. The belt extends upwardly and is trained about a pulley 60, the pulley 60 being mounted on a shaft 61 which is carried by bearing support structure 62 mounted on the upper end extension of the panel 3 and also in the gearbox 64.

The gearbox 64 is suitably mounted on the beam structure 6 and has an input shaft portion 65, the forward end 66 of which is adapted for connection to an associated power unit such as a power take-off of a tractor.

The pin 36 which forms the junction between the spring assemblies and the crushing roll mounting arms 38 also pivotally connects to the lower end of an operating link or pull member 80 which has an elongated slot 81 which cooperates with a pin or bolt 82 mounted on the lower end of an arm 83 which is connected to the rockshaft 84. There is an arm 83 adjacent each end of the rockshaft 84 and the outer extremities of the rockshaft 84 mount rearwardly extending arms 86 each having an outwardly extending spindle 87 mounting an associated supporting wheel 88, as best seen in the drawings.

Thus it will be seen that by swinging movements of the arms 86 the supporting wheels swing with respect to the machine and in effect raise and lower the entire unit and at the same time as the rockshaft 84 is swung it in turn rotates the arm 83 which moves the bolt 82 within the slot 81 until the upper end of the slot is reached whereupon it pulls on the member 80 and lifts the point 36 upwardly thus disengaging the upper roll 41 from the lower roll 50.

The rockshaft 84 is mounted at each end in bearings 90 on a generally horizontal transverse axis, the bearing 90 being suitably mounted on the associated framework or paneling 3. The rockshaft 84 is provided intermediate its ends with an upstanding lever 91, the upper end of which is pivoted as at 92 to the piston 93 of a ram 94, the cylinder 95 of which is provided with an ear 96 which is pinned by pin 97 to the bracket 98, the bracket 98 being connected and extending laterally from one side and intermediate the ends of a fore-and-aft extending tongue or draft member 99 which is part of the framework of the unit.

It will be seen that the lower end of the lever 91 is connected by a transverse pin 100 to a clevis 101 which in turn is connected to an eye 102 of a rod 103 which extends through diametrical openings 104 in the front crossbrace 105 of the frame structure of the hay conditioning unit. The rod 103 projects through an elongated cylindrical housing 106 of a shock absorbing unit generally designated 107, said housing 106 having a radial inner end wall portion 108 with an aperture 109 therethrough through which the rod 103 projects, said rod also projecting through an opening 110 in a washer 111 which fits complementally within the interior bore or surface 112 of the housing 106 which in the present instance is preferably cylindrical. A plurality of disks of elastomer material 113—113 are stacked together and provided with center apertures 114 admitting the rod 103 therethrough, the disks having their outer peripheries complemental to the interior 112 of the housing and the outermost disk being engaged by a washer 115 which also fits complementally within the housing 107, said washer being engaged externally by an adjusting screw 116 which has an arm 117 pursuant to which the screw may be rotated about the outer threaded end 118 of the rod. It will be understood that by rotating the nut by the handle 117 the position of the rod 103 is extended or retracted with respect to its point of connection at 100 at the lower end of the lever 91. This in turn determines the position of the rockshaft 84 which in turn determines the position of the arms 86 connected thereto and therefore in effect locates the position of the wheels 88.

It will be noted that since the hydraulic unit 95 is a single acting cylinder in that the fluid acts to extend the stem 93 in raising the unit which in turn rotates the arms 86 in a clockwise direction as seen in FIG. 2 thus in effect elevating the crushing component generally designated 120. At the same time the toggle is acted upon opening the crushing rolls by springing the carriers 38 upwardly in a clockwise direction as seen in FIG. 2. Thus in addition to the weight of the machine reacting against the hydraulic cylinder there is also the action of the toggle mechanism at each side of the machine tending to collapse the cylinder. In order to lower the unit the hydraulic cylinder 95 is evacuated whereupon the lever 91 rotates in a counterclockwise direction (FIG. 2), and simultaneously the arms 86 swing rearwardly, that is, in a counterclockwise direction so that the unit falls. At the same time the toggle mechanism assumes the full line position of FIG. 2 from the dotted line position shown in this figure. Under these circumstances the lower end of the lever 94 swings rearwardly, that is, in a clockwise direction as seen in FIG. 3, until it moves the rod 103 rightwardly and through the nut and washer 116, 115 and compresses the elastomer material 113—113 of the shock absorber within the housing 107. It will be observed that by adjusting the position of the nut 116 the final position of the unit is determined since this structure serves not only as a shock absorber but also as an adjusting means. It will be noted that under these circumstances the slot 81 and the position of the arm 83 is such that the upper roll shall have engaged the lower roll or be so arranged with respect thereto to cooperate therewith as respect to the adjustment of the stops 121 which cooperate with the lower edges of the members 38 so that there is no loading through the links 80 on the shock absorbing unit.

Having thus described a preferred embodiment of the invention, it will be understood that there are several forms of the invention that become readily apparent to those skilled in the art within the scope of the appended claims.

What is claimed is:

1. In a hay conditioner having a hay conditioning component and a wheel and axle assembly swingably mounted thereto and operative to raise and lower said component attendant to such swinging movement, said component comprising a pair of cooperative hay conditioning rollers, one of said rollers movable toward the other of said rollers, a hydraulic ram connected between said component and wheel and axle assembly, said ram being characterized upon being unloaded causing said component to fall freely, and shock absorbing means interposed between said assembly and the movable one of said rollers of said component for cushioning the fall of the latter.

2. The invention according to claim 1, said connection between said ram and component comprising a lever connected to the ram, a wheel and axle assembly actuating shaft mounted on the component and connected to said lever, and said lever connected to the shock absorbing means.

3. The invention according to claim 1 and operating linkage for the wheel and axle assembly, and said component comprising a frame, said shock absorbing means comprising a rod connected to the linkage, a yieldable shock absorbing structure reactively mounted to the frame, said rod projecting through the structure, and means on the rod for shortening and lengthening the same.

4. The invention according to claim 3 and said shock absorbing structure comprising a casing admitting the rod therethrough, abutments on the rod, and fiber impregnated disks of elastomer material within the casing sleeved over the rod between said abutments, one of the abutments engaging said means on the rod and the other engaging the casing.

References Cited in the file of this patent
UNITED STATES PATENTS 2,918,298     Starr                 Dec. 22, 1959
2,974,976     Lyall                 Mar. 14, 1961
3,039,256     Witt                  June 19, 1962